(12) United States Patent
Greenaway et al.

(10) Patent No.: US 7,554,672 B2
(45) Date of Patent: Jun. 30, 2009

(54) PHASE-DIVERSITY WAVEFRONT SENSOR

(75) Inventors: Alan Howard Greenaway, Edinburgh (GB); Heather Isla Campbell, Edinburgh (GB); Sijiong Zhang, Edinburgh (GB)

(73) Assignee: Heriot-Watt University, Riccarton, Edinburgh ( * ) Notice: Subject to any disclaimer, the term of this patent is extended or adjusted under 35 U.S.C. 154(b) by 233 days.

(21) Appl. No.: 10/561,206

(22) PCT Filed: Jun. 21, 2004

(86) PCT No.: PCT/GB2004/002657

§ 371 (c)(1),
(2), (4) Date: Dec. 19, 2005

(87) PCT Pub. No.: WO2004/113856

PCT Pub. Date: Dec. 29, 2004

(65) Prior Publication Data

US 2006/0175528 A1     Aug. 10, 2006

(30) Foreign Application Priority Data

Jun. 20, 2003   (GB)   ................................ 0314444.1

(51) Int. Cl.
   *G01B 9/02* (2006.01)
(52) U.S. Cl. ..................................................... 356/512
(58) Field of Classification Search ................. 356/121, 356/512, 521, 124
See application file for complete search history.

(56) References Cited

U.S. PATENT DOCUMENTS

| | | | |
|---|---|---|---|
| 4,653,921 A * | 3/1987 | Kwon | 356/521 |
| 5,120,128 A * | 6/1992 | Ulich et al. | 356/121 |
| 5,426,521 A * | 6/1995 | Chen et al. | 359/9 |
| 6,639,683 B1 * | 10/2003 | Tumbar et al. | 356/521 |
| 6,975,457 B1 | 12/2005 | Greenaway et al. | |
| 7,419,264 B1 | 9/2008 | Otten, III et al. | |

FOREIGN PATENT DOCUMENTS

| | | | |
|---|---|---|---|
| WO | WO 99/46768 | * | 9/1999 |
| WO | WO 00/17612 | * | 3/2000 |
| WO | 03/022139 | | 3/2003 |

OTHER PUBLICATIONS

Naumov et al, Wave front sensor with an unharmonic grating, SPIE vol. 2713, pp. 435-441.*
Blanchard et al, Phase-diversity wave-front sensing with a diffraction grating, Applied Optics, vol. 39, No. 35, Dec. 2000, pp. 6649-6655.*
Chang et al, A grating based curvature sensor, SPIE vol. 4926, 2002, pp. 101-106.*

* cited by examiner

*Primary Examiner*—Samuel A Turner (57) ABSTRACT

A measuring apparatus provides data relating to the shape of an input radiation wavefront, the wavefront shape being describable at a pre-determined location in an optical system. The apparatus includes an aberration device which provides an aberration to the input radiation wavefront, the shape of which is defined by a filter function that is complex valued and has non-mixed symmetry, and a detector having a radiation sensitive surface capable of detecting the intensity of incident radiation on the surface, the detector being coupled to an output device that provides a measure of the intensity of the incident radiation. The aberration device is configured to act on an input wavefront shape to produce first and second output radiation signals that are detected by the detector and in combination cause the output device to provide data indicating an extent to which the wavefront shape is non-planar.

27 Claims, 9 Drawing Sheets

Original signal phase

FIG. 4a

+1 diffraction order intensity

FIG. 4b

-1 diffraction order intensity

FIG. 4c difference between +1 and -1 order intensity

FIG. 4d

Original signal phase

FIG. 9a

Retrieved signal phase

FIG. 9b

Error graph

FIG. 9c difference between original phase and retrieval phase

FIG. 9d

+1 order Intensity ×10⁴

FIG. 9e

-1 order intensity ×10⁴

PRIOR ART

FIG. 10(a)(ii)

PRIOR ART

FIG. 10(a)(iii)

PRIOR ART

FIG. 10(b)(iii)

annular pupils
1) Defocus ($2*r^2$, circular pupil)

Spherical ($6*r^4$, annular pupil)

PHASE-DIVERSITY WAVEFRONT SENSOR

CROSS REFERENCE TO RELATED APPLICATIONS

This application is the national phase under 35 U.S.C. § 371 of PCT International Application No. PCT/GB2004/002657 which has an international filing date of 21 Jun. 2004, and also claims priority under 35 U.S.C. § 119 to Great Britain patent application 0314444.1 filed on 20 Jun. 2003.

The present invention relates to a novel wavefront sensor having a novel aberration means which can be constructed as a diffractive optical element (DOE) and which is suitable for use in adaptive optics.

Adaptive optics (AO) is a technique in which real-time modification of the properties of an optical system based on measured optical output is used to indicate system optical performance. AO systems are widely used for compensation of turbulence in imaging through turbulent media in astronomical[i] and military[ii] applications, for control of laser-beam deliver[iii], for control of laser resonator properties[iv], for ophthalmic applications[v] and in other areas. In addition, aberration means can be used for measuring the distorting effect of a mirrored surface on an incident wavefront when it is reflected from the mirrored surface.

AO systems typically comprise 3 components:
- a wavefront modulator (WFM) which alters the optical properties of the system in response to a command signal;
- a wavefront sensor (WFS) which monitors the difference in state between the desired optical performance and the current optical performance of the system; and
- a control loop which drives the WFM in response to the output from the (WFS).

For control of an adaptive optical system it is not necessary to reconstruct the input wavefront. A sufficient condition for satisfactory operation of an adaptive optical system is the ability to drive a wavefront modulator using a null sensor. In these circumstances, a control signal derived from a wavefront sensor system is used to indicate the size and, preferably, the location and the direction of the wavefront error. Thus, if the wavefront modulator is providing full correction of the input wavefront error, the control signal will be zero and the wavefront modulator will not be driven from its present position. The simplest example of such systems are based on multi-dither techniques applied, for example[vi], to the correction of thermal lensing in laser resonators.

The phase-diversity[vii] algorithm can also be used to reconstruct the wavefront phase by using data corresponding to images of the input wavefront intensity on two planes normal to the direction of propagation and located at different positions along the axis of propagation. The approach taken is generally close to the 'two-defocus' method used in microscopy[viii] and operates with two close-to-focus images[ix]. Although the data planes are generally described as symmetrically placed about the image plane, they can equally well be symmetrically placed about the system input pupil[x], in which case the phase diversity algorithm becomes essentially the same as the wavefront curvature algorithm[xi].

For measurements on planes symmetrically spaced either side of either the image or the pupil planes, the intensity on the two measurement planes will be identical, and the difference between the images will be zero, if and only if, the wavefront in the entrance pupil plane is a plane wavefront.

The measurement of the difference between the intensity on the two data planes (the phase-diverse data), thus satisfies the requirements for a null sensor because it provides a zero result when a plane wavefront occurs at the (input) pupil plane. If the input wavefront is distorted, the propagation between the measurement planes results in excess convergence (concave wavefront) or excess divergence (convex wavefront) and the resulting intensity difference between the measurement planes is indicative of the location, magnitude and direction of the wavefront curvature.

Figure 1A:
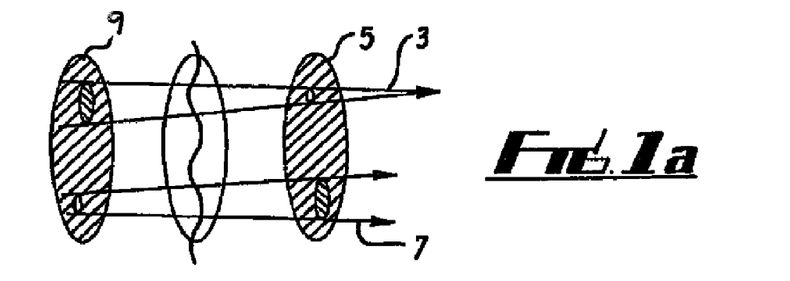
FIGS. 1a and 1b show a series of wavefronts propagating and illustrate variations in local beam intensity.

FIG. 1a shows a concave wavefront 3 propagating from left to right. For the sampled rays 3 shown, there is a local increase of intensity on one plane 5 and a decrease on the other plane 9. A convex wavefront 7 leads to a decrease in the local intensity. In each case, the intensities recorded in the +1 and −1 diffraction orders represent the intensities on the ends of the cylinder.

Figure 1B:
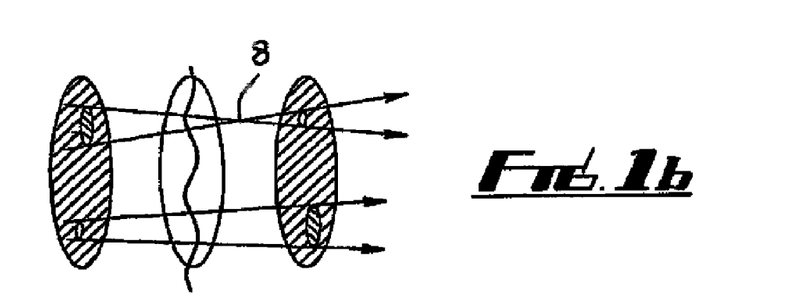

FIG. 1b shows that ambiguity can arise if the curvature of the wavefront 8 is so severe that a focus point occurs within the volume sampled by the measurements. The upper part of each figure leads to the same intensity increase.

Data on two image planes can be recorded using various approaches, including physical displacement of the image plane[x], use of a vibrating spherically-distorted mirror, beam splitters and folded optical paths, or by the use of off-axis Fresnel lenses[ix]. Each of these approaches allows the recovery of phase information from two data sets recorded under different focus conditions. As such, all of these approaches are related to the two-defocus methods applied in electron microscopy in the 1970s.

Alternatively, a matched filter approach[xii], can be adopted by using a diffractive optical element to provide a pair of spots whose axial intensity (passing through a pinhole) defines the amplitude of each aberration mode in a distorted wavefront.

For reconstruction of the wavefront phase the inverse problem may be solved iteratively[xiii,xiv] or presented in terms of the differential Intensity Transport Equation (ITE) and solved through the use of Green's functions[xv] with the phase-diverse data providing an estimate of the axial derivative of the intensity. Assumptions imposed through use of the ITE involve uniformity of the input intensity in the entrance pupil, continuity in the wavefront phase and continuity of the first derivative of the wavefront phase[xvi].

At the expense of assumptions imposed on the uniformity of the input illumination, the work on phase-diversity has progressed a long way from the early electron microscope applications of the two-defocus technique and ITE-based approaches have demonstrated real-time data reduction with high (sub-nanometre) accuracy[xvii]. However, in all cases the two data sets are recorded under conditions where the wavefront is subject to a known defocus aberration between the two measurements.

The restrictions on the uniformity and continuity of the input wavefront mean that current wavefront sensors cannot be used with scintillated, discontinuous, or multiply-connected wavefronts. There are many areas in which a generalised method which can cope with scintillated, discontinuous and disconnected wavefront segments would be a great advantage. One example is in polishing machines, where it would be useful to measure in situ the surface profile of the object being polished. This would inevitably involve laser illumination of rough surfaces. It would also be useful to be able to image silicon circuitry, which by definition, is highly discontinuous. In addition, modern large-aperture astronomical telescopes are likely to be constructed using segmented, thus multiply-connected, mirror segments.

It is an object of the present invention to provide a wavefront sensor which uses the null sensor concept that will produce a null output if the input wavefront is a plane wave, but which will return an error signal when the input is distorted. A plane wave is defined as having constant phase across its wavefront. Without loss of generality that phase can be taken to be zero, so that its Fourier transform of the input wavefunction is Hermitian.

In accordance with a first aspect of the present invention there is provided a measuring apparatus for determining data relating to the shape of an input radiation wavefront, the wavefront shape being describable at a pre-determined location in an optical system:

the apparatus comprising aberration means, the shape of which is defined by a filter function;

detection means having a radiation sensitive surface capable of detecting the intensity of incident radiation on the surface, the detection means being coupled to an output device that provides a measure of the intensity of the incident radiation;

wherein the aberration means acts on any input wavefront shape to produce first and second output radiation signals that in combination provide data from the output device on the extent to which the wavefront shape is non-planar.

Preferably, the aberration means creates at least two filter functions, these filter function being complex conjugate pairs.

Preferably, the filter functions are complex valued and have non-mixed symmetry. This feature allows the invention to be used for the analysis of scintillated discontinuous or disconnected wavefront segments.

The filter function cannot be described by a pure defocus or an aberration means consisting of a diffractive optical element with essentially quadratic curvature in the grating. Defocus diffractive optical elements cannot be used in the analysis of scintillated, discontinuous or disconnected wavefront segments without generating boundary errors related to the wave shape.

Preferably, the measuring apparatus further comprising a wavefront modulator.

Preferably, the wavefront modulator is configured to transform a wavefront being describable by means of a complex function into a wavefront being describable by a real function.

Preferably, the output device is provided with calculation means for calculating the difference between the first and second radiation signals.

Preferably, the radiation sensitive surface of the detection means is provided with elements that allow the measurement of radiation intensity at different points across the surface of the detection means.

Preferably, the output device is provided with calculation means for calculating the difference between the first and second radiation signals at different points across the surface of the detection means.

Preferably, the wavefront modulator is coupled to the output device such that the wavefront modulator is distorted to provide a correction to a non-planar input radiation wavefront.

Preferably, the aberration function is a weighted sum of Zernike polynomials arranged to equalise the signal generated from each mode of deformation in the input wavefront according to the expected statistical distribution of such modes in the input wavefront.

Preferably, the aberration means is arranged such that the complex conjugate filter functions of the aberration means are associated with diffraction orders of the same order but having different sign.

Preferably, the first and second output radiation are produced simultaneously.

Optionally, the first and second output radiation are produced sequentially.

Preferably, the aberration means is a diffractive optical element.

Optionally, the aberration means can be a variable-shape optical mirror

Optionally, the aberration means is a variable refractive index device.

Optionally, the variable refractive index device is a liquid crystal phase modulator used sequentially to provide complex conjugate aberrations or to provide a programmable diffractive optical element.

Optionally, the aberration means is a deformed reflective surface where the illumination of that surface from each side produces the complex conjugate aberration functions.

In accordance with a second aspect of the present invention there is provided a method for determining data relating to the shape of an input radiation wavefront, the wavefront shape being describable at a pre-determined location in an optical system: the method comprising the steps of transmitting said input radiation wavefront through an aberration means, the shape of which is defined by a filter function detecting the intensity of incident radiation on a surface, sending the detected intensity to an output device that provides a measure of the intensity of the incident radiation;

wherein the aberration means acts on any input wavefront shape to produce first and second output radiation signals that in combination provide data from the output device on the extent to which the wavefront shape is non-planar.

Preferably, the iterative reconstruction is used to reconstruct the wavefront shape.

Preferably, the filter function is complex valued and has non-mixed symmetry.

In accordance with a third aspect of the present invention there is provided a diffractive optical element comprising aberration means, the shape of which is defined by a filter function that is complex valued and which has non-mixed symmetry.

Preferably, the aberration means can be a variable-shape optical mirror

Preferably, the aberration means is a variable refractive index device.

More preferably, the variable refractive index device is a liquid crystal phase modulator used sequentially to provide complex conjugate aberrations.

Preferably, the aberration means is a deformed reflective surface where the illumination of that surface from each side produces the complex conjugate aberration functions.

In accordance with a fourth aspect of the present invention there is provided a method for creating a diffractive optical element comprising the steps of defining aberration means the shape of which is defined by a filter function and which has non-mixed symmetry, applying said filter function to an optical element to create a diffractive optical element.

Sufficient conditions for the null sensor are that it should give null output for input wavefunctions whose Fourier transforms have Hermitian symmetry, and that it give non-zero output for non-plane input wavefronts. In addition, the filter function should be complex. Hermitian symmetry exists where a function reflected in the origin is the complex conjugate of itself.

Conditions where the real or imaginary part of the filter function is zero should be avoided to prevent a situation arising where the sensor will give null output for any input. In addition, mixed symmetries of the real and imaginary parts of the filter function should be avoided, since such filter functions provide an output signal even for a plane wave input For unambiguous sensor output the real and imaginary parts of the filter function should have either both odd or both even symmetry. From these conditions it is possible to construct a null sensor without having placed any limiting assumptions on the input wavefront. This method will therefore be suitable for scintillated and discontinuous input wavefronts.

In accordance with a fifth aspect of the invention, there is provided a wavefront sensor comprising:
  imaging means
  aberration means
  detecting means
  feedback means,
  arranged such that the imaging and detecting means capture images of the wavefront field in a manner such that the wavefront field imaged is subject to two or more different aberrations imposed by the aberration means.

Preferably, the aberration means when combined with the imaging means can deliver to the detecting means simultaneously or sequentially images of the input wavefront field subject to different but known aberration point spread functions (psf) such that the filter functions (Fourier transforms of the aberration psfs) have complex odd or complex even symmetry and at least two of the images are subject to filter functions that are complex conjugate pairs.

The aberration means does not provide pure defocus aberrations.

The filter functions may be described by any pure Zernike polynomial.

Preferably, an electronic feedback means is arranged to deliver to an adaptive optics wavefront modulator a signal derived from the difference between the images affected by the complex conjugate filter functions and used to drive the wavefront modulator in such a manner that the feedback signal strength is zero when the images recorded with complex conjugate filter functions are identical.

Preferably, the filter functions can be a weighted sum of Zernike polynomials arranged optimally to equalise the signal generated from each mode of deformation to be corrected in the input wavefront field according to the expected statistical distribution of such modes in the input wavefront field.

Preferably, the aberration means is a diffractive optical element arranged such that the complex conjugate filter functions are associated with diffraction orders of the same order but different sign (±1, ±2, etc). Alternatively, the aberrating means can be a variable-shape optical mirror or a variable refractive index device such as a liquid crystal phase modulator used sequentially to provide complex conjugate filter functions. Optionally, the aberration means can also consist of a deformed reflective surface where the illumination of that surface from each side produces the complex conjugate filter functions.

The following analysis show that the filter functions created by the aberration means are capable of encoding the sense and location of wavefront errors on heavily scintillated and discontinuous input wavefronts. The necessary and sufficient conditions required of filter functions suitable for use in a generalised phase-diversity null wavefront sensor for adaptive optics applications are quantified.

Let $\Psi(r)=|\Psi(r)|e^{i\phi(r)}$ represent the complex amplitude distribution in the entrance pupil of an optical system, r being the co-ordinate in the pupil plane. If $\Psi(r)$ represents a plane wavefront, the phase satisfies $\phi(r)$=constant. Any spatial variation in the wavefront phase represents a distortion, or aberration, that requires correction in an AO system.

To operate successfully as a null wavefront sensor in an AO system we require a device that produces an error signal where, $\phi(r)$ is not constant. For the purposes of this analysis, the optical output from monochromatic systems are considered. Thus a discontinuity of exactly an integral number of wavelengths in size does not affect the optical output, e.g. image intensity profile, and may be regarded as an undistorted wavefront. Such a discontinuity may be an important wavefront error in metrology applications. It is desirable that the error signal provides information that localises the wavefront error in r-space and indicates the sense in which correction should be effected (in the absence of such indication a multi-dither technique[xviii] is required to effect correction).

Let $\psi(\xi)=H(\xi)+A(\xi)$ be the Fourier transform of $\Psi(r)$, where $H(\xi)$ and $A(\xi)$ represent respectively the Fourier transforms of the real and imaginary parts of $\Psi(r)$. Clearly, $H(\xi)$ is Hermitian and $A(\xi)$ is anti-Hermitian. These symmetry properties will be required later. Thus, $$H(\xi)=H^*(-\xi)$$

$$A(\xi)=-A^*(-\xi) \quad (1)$$

Let $F_\pm(\xi)=R(\xi)\pm iI(\xi)$ be the filter function that is the Fourier transform of an aberration psf $f_\pm(r)$, which represents a complex function with which $\Psi(r)$ is convolved when forming an image of the system entrance pupil. The functions $R(\xi)$ and $I(\xi)$ are real-valued functions and the ± indicates the use of two filter functions, in which the Fourier phase of the filter is reversed. In this work we are particularly interested in the necessary and sufficient conditions that constrain $R(\xi)$ and $I(\xi)$ in such a way that $F_\pm(\xi)$ are suitable filter functions to provide a null wavefront sensor for use in adaptive optics.

Figure 2:
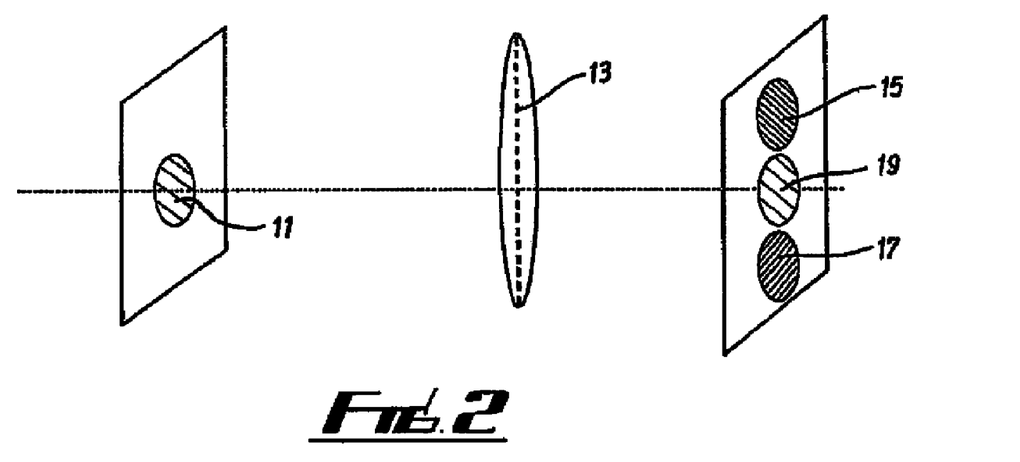
FIG. 2 illustrates a wavefront and a diffractive optical element which provides the aberration means.

The physical relationship between these different functions is indicated schematically in FIG. 2 where wavefront 11 is shown along with a diffractive optical element which provides the aberration means 13. Images 15 and 17 with aberration function $j_+(r)$ and functions $j_-(r)$ respectively are shown along with an image 19 of the wavefront.

The detected intensity function may thus be written $$j_\pm(r)=|\int d\xi \psi(\xi) F_\pm(\xi) e^{-i\xi \cdot r}|^2. \quad (2)$$

Substituting for $F_\pm$, expanding and simplifying, the difference between the images formed using the two filter functions may be expressed $$d(r) = j_+(r) - j_-(r) \quad (3)$$
$$= 2i\left[\int d\xi \psi(\xi) I(\xi) e^{-ir\xi} \int d\xi' \psi^*(\xi') R(\xi') e^{ir\xi'} - \int d\xi \psi(\xi) R(\xi) e^{-ir\xi} \int d\xi' \psi^*(\xi') I(\xi') e^{ir\xi'}\right]$$

This is a real-valued function, since the quantity in [ ] is a difference of two complex conjugates and is thus imaginary-valued, so $$\frac{d(r)}{2i} = \quad (4)$$
$$\int d\xi [H(\xi)+A(\xi)]I(\xi)e^{-ir\xi}\int d\xi'[H^*(\xi')+A^*(\xi')]R(\xi')e^{ir\cdot\xi'} -$$

-continued $$\int d\xi [H(\xi) + A(\xi)]R(\xi)e^{-ir\cdot\xi} \int d\xi' [H^*(\xi') + A^*(\xi')]I(\xi')e^{ir\cdot\xi'}.$$

The rhs of (4) can then be expanded and the terms grouped into 4 separate expressions which are equal to the rhs of (4) when summed:

$$\int d\xi H(\xi)I(\xi)e^{-ir\cdot\xi}\int d\xi' H^*(\xi')R(\xi')e^{ir\cdot\xi'} - \int d\xi H(\xi)R(\xi)e^{-ir\cdot\xi}\int d\xi' H^*(\xi')I(\xi')e^{ir\cdot\xi'} \quad (5.1)$$

$$\int d\xi H(\xi)I(\xi)e^{-ir\cdot\xi}\int d\xi' A^*(\xi')R(\xi')e^{ir\cdot\xi'} - \int d\xi A(\xi)R(\xi)e^{-ir\cdot\xi}\int d\xi' H^*(\xi')I(\xi')e^{ir\cdot\xi'} \quad (5.2)$$

$$\int d\xi A(\xi)I(\xi)e^{-ir\cdot\xi}\int d\xi' H^*(\xi')R(\xi')e^{ir\cdot\xi'} - \int d\xi H(\xi)R(\xi)e^{-ir\cdot\xi}\int d\xi' A^*(\xi')I(\xi')e^{ir\cdot\xi'} \quad (5.3)$$

$$\int d\xi A(\xi)I(\xi)e^{-ir\cdot\xi}\int d\xi' A^*(\xi')R(\xi')e^{ir\cdot\xi'} - \int d\xi A(\xi)R(\xi)e^{-ir\cdot\xi}\int d\xi' A^*(\xi')I(\xi')e^{ir\cdot\xi'} \quad (5.4)$$

This expression for the difference between the two detected intensity functions is generally valid—no restricting assumptions have so far been made. We may now investigate under what conditions of symmetry these expressions individually, or summed, are identically zero.

Conditions for operation as a null wavefront sensor 3.2.1 Filter Function must be Complex Unless both R and I are non-zero, all of the terms in equations (5) are identically zero $\forall \psi$. Thus d(r) is identically zero for all input wavefronts and no error signal is generated from a non-flat wavefront.

This may be readily understood since if $I(\xi)$ is zero $F_\pm$ is identical whatever the arithmetic sign, so the two images are identical $\forall \psi$. If $R(\xi)$ is zero the change of arithmetic sign is lost by the modulus square operation that is an inevitable part of quadrature detection processes—and thus the two images are again identical $\forall \psi$.

3.2.2 Complex Filter Function 3.2.2.1 Even Symmetry

Suppose that both $I(\xi)$ and $R(\xi)$ are even functions of $\xi$.

Consider the first expression (5.1). Since $H(\xi)$ is Hermitian and $I(\xi)$ is symmetric and real-valued the product $H(\xi)I(\xi)$ is Hermitian. Thus the Fourier integral $\int d\xi H(\xi)I(\xi)e^{-ir\cdot\xi}$ is real-valued. The same is true of $\int d\xi' H^*(\xi')R(\xi')e^{ir\cdot\xi'}$. The second product of two integrals is term by term the complex conjugate of the first product. Thus expression (5.1), the difference between two complex conjugates, is always zero when both $I(\xi)$ and $R(\xi)$ are symmetric.

Similarly (5.4) is always zero because each of the integrals reduces to a purely imaginary function. The product of these imaginary functions is real and the difference between the two complex conjugate terms is again always zero.

Thus the difference between the two images is the sum of (5.2) and (5.3) and can be written $$\frac{d(r)}{2i} = \int d\xi H(\xi)I(\xi)e^{-ir\cdot\xi}\int d\xi' A^*(\xi')R(\xi')e^{ir\cdot\xi'} - \quad (6)$$

$$\int d\xi A(\xi)R(\xi)e^{-ir\cdot\xi}\int d\xi' H^*(\xi')I(\xi')e^{ir\cdot\xi'} +$$

$$\int d\xi' A(\xi)I(\xi)e^{-ir\cdot\xi}\int d\xi' H^*(\xi')R(\xi')e^{ir\cdot\xi} -$$

$$\int d\xi H(\xi)R(\xi)e^{-ir\cdot\xi}\int d\xi' A^*(\xi')I(\xi')e^{ir\cdot\xi'}$$

In equation (6), for each pair of integrals one integral reduces to a real-valued function and the other integral to an imaginary-valued function. The first and second terms, also the third and fourth terms, are complex conjugate pairs and thus the rhs of (6) is imaginary valued or zero.

If either H or A is zero or if $A=He^{i\phi}$ with $\phi$ constant, equation (6) and thus d(r), is zero. However, these conditions are exactly those under which the input wavefront is flat and a null sensor is required to produce a null output.

Thus, if the filter function is complex with even symmetry the difference between the two images formed using these filters forms a potentially-useful null wavefront sensor.

3.2.2.2 Odd Symmetry

Suppose that both $I(\xi)$ and $R(\xi)$ are odd functions of $\xi$.

In (5.1) and in (5.4) the odd symmetry of the real functions R and I means that the products within the integrals in (5.1) have anti-Hermitian symmetry and those within (5.4) have Hermitian symmetry. Thus, although the arguments given are reversed for each term from those given in 3.2.1, both (5.1) and (5.4) are identically zero $\forall \psi$. Thus d(r) again reduces to equation (6). The arguments from 3.2.1 again hold, although the role of the terms is reversed, one term in each integral product is purely real and the other term purely imaginary.

Thus a filter function with complex odd symmetry is potentially suitable for use as a filter function for wavefront sensing.

3.2.2.3 Mixed Symmetry

Suppose that one of $I(\xi)$ and $R(\xi)$ is an even function of $\xi$ and the other is an odd functions of $\xi$.

In (5.1) the mixed symmetry will result in one of the integrals in each product being purely imaginary and the other integral purely real (dependent on whether I or R is odd). In either case the product of the integrals is purely imaginary and thus (5.1) is purely imaginary or zero. An equivalent argument shows that (5.4) is purely imaginary or zero.

Note, however, that the expressions (5.1) and (5.4) are reliant on the interactions between H and the filter function or on A and the filter function and do not involve cross terms between H and A.

In equation (6) the mixture of odd and even symmetry will mean that both integrals in each product are either purely real or purely imaginary. In each case the product of these terms will be purely real and the difference of the complex conjugates will thus bezero $\forall \psi$.

Thus, filters with mixed symmetry produce no error signal dependent on the deviation of the wavefront from a plane wave and thus such filters are unsuitable for use as a wavefront sensor.

3.2.3 Sensing the Error Direction

Information about the wavefront aberrations is encoded by the sum of the cross terms in equation (6).

If the sense of the wavefront error is reversed, the phase of the wavefront will change arithmetic sign. This means that for a wavefront error of a given amplitude the error signal (equation (6) for filter functions with complex even or complex odd symmetry) changes sign if the sense of the error is reversed. The wavefront sensor thus delivers an error signal that preserves information about the sense of the wavefront error.

Note that, since the relationship between the error signal and the wavefront error is non-linear (involving the balance between H and A in the description of the wavefront), this does not guarantee that the error signal can be inverted to find the wavefront shape.

3.2.4 Localising the Wavefront Error

Returning to equation (6) we note that each of the integrals, when expressed as a function of r appears in the form of a convolution of H or A with a real-valued function deriving from the filter function. As the products are of complex functions and real-valued function the phase of the product is identically equal to that of the Hermitian or Anti-Hermitian function in each integral.

Without loss of generality, the location of the wavefront error can be identified with the position at which a(r), the Fourier transform of A(ξ), is non-zero. Because no phase ramp is added by the product with the real-valued filter function, the location of the non-zero component is, in some sense, localised at the point where a(r) is non-zero.

The key term that encodes information about the wavefront aberrations is the sum of the cross terms in equation (6).

If the sense of the wavefront error is reversed the arithmetic sign of A(ξ) reverses because the phase of the wavefront will change arithmetic sign. This means that, for a wavefront error of given amplitude, the error signal (equation (6) for filter functions with complex even or complex odd symmetry) changes sign if the sense of the error is reversed. The wavefront sensor thus delivers an error signal that preserves information about the sense of the wavefront sensor.

Equation (6) also provides localisation of the wavefront error. Each of the integrals, when expressed as a function of r, appears in the form of a convolution of the Fourier transform of H or A with a Hermitian function related to the filter function. Without loss of generality, the location of the wavefront error can be identified with the position at which a(r), the Fourier transform of A(ξ), is non-zero (a(r) is directly related to the phase distortion). The function with which the convolution takes place may or may not have a maximum at the origin. When it does not the location of the non-zero component is, in some sense, localised at the point where a(r) is non-zero, in the sense that it may be distributed around the position at which a(r) is non-zero. When the intensities are recorded in pupil space this provides the localization required for a null wavefront sensor.

The present invention will now be described by way of example only with reference to the accompanying drawings of which:

FIG. 10(a) (i) to (iii) show the wavefront intensity of a wavefront in the pupil phase, the output intensity distribution of a difference image and the associated prior art quadratic diffractive optical element;

FIGS. 10(b) (i) and (iii) show the wavefront intensity of a wavefront in the pupil phase, the output intensity distribution of a difference image and the associated pure spherical diffractive optical element according to an embodiment of the present invention.

The requisite filter functions could be implemented in several ways, but one of the most straightforward approaches (for use with quasi-monochromatic radiation) is to use a diffractive optical element (DOE) to introduce the aberration.

FIG. 2 shows a DOE used to implement the requisite filter functions in the ± diffraction orders and the zero order contains an image of the field to be reconstructed. In situations where the photometric efficiency is important a phase grating may be used and the depth of the grating adjusted to reduce to zero, or close to zero, the flux in the zero diffraction order. In FIG. 2, the DOE 13 is shown that is used to generate the aberrations, the image with aberration psf $j_+(r)$, 15 and the image with aberration psf $j_-(r)$, 17 are also shown along with a representation of the wavefront to be reconstructed 19. From 19 we can tell whether the wavefront to be reconstructed is scintillated, multiply connected, uniform intensity etc.

Figure 3:
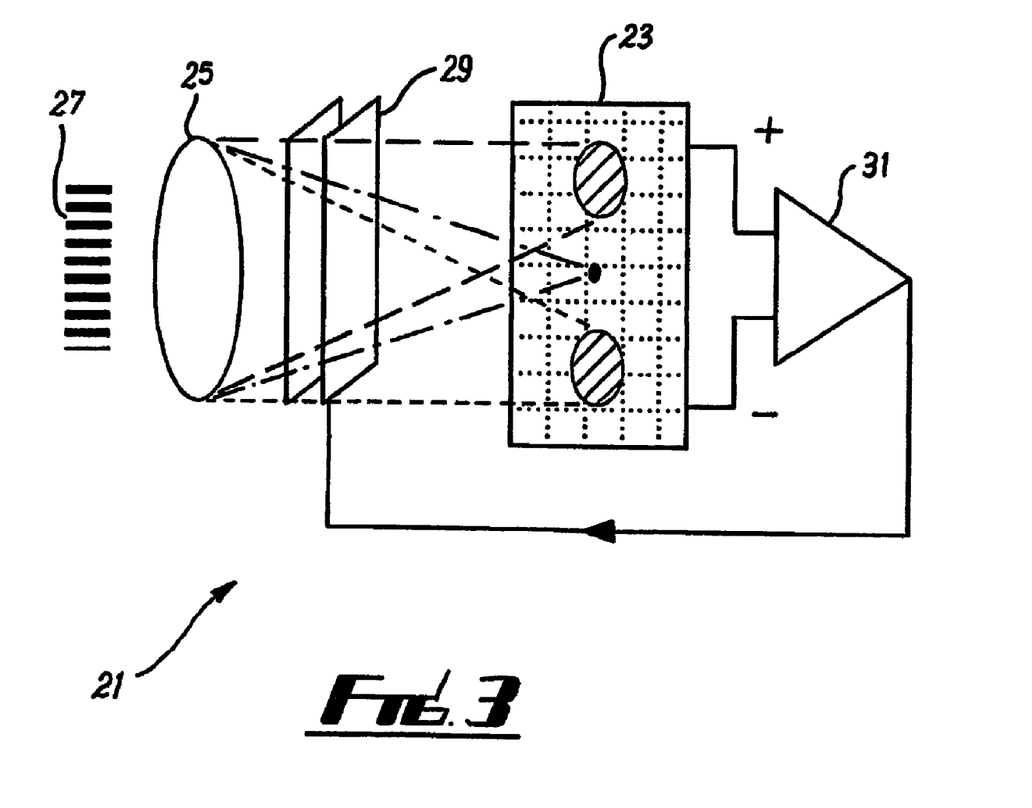
FIG. 3 illustrates a phase diversity wavefront sensor according to an embodiment of the present invention.
Figure 4A:
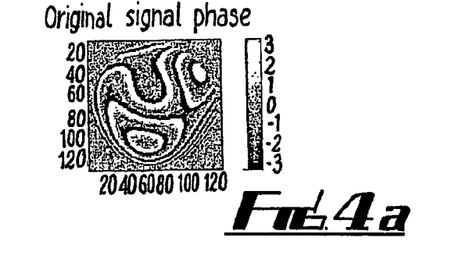
FIGS. 4a to 4d show simulation results with a non-plane wavefront input and an even symmetry phase diversity filter.
Figure 4B:
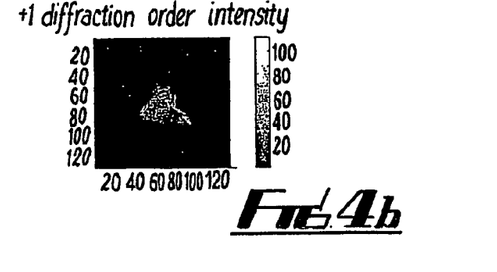
Figure 4C:
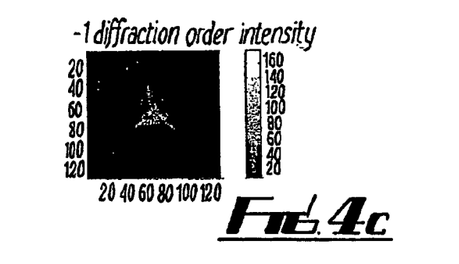
Figure 4D:
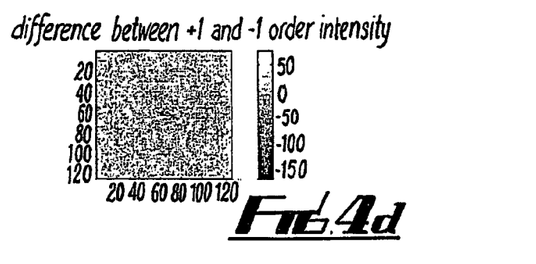

FIG. 3 shows the combination of DOE 27 (diffraction grating) with SLM 29 (spatial line modulator) operated using liquid crystals in this example. The wavefront modulators are used to produce an adaptive optical system for driving a null sensor. In FIG. 3 the CMOS (complementary metal oxide semiconductor) camera 23 used to detect the j+1 and j−1 signals is shown along with the lens 25 and logic circuit 31 which provides an electrical control system that is used to control the SLM 29 thereby altering the shape of the wavefront in response to errors detected in the j+1 and j−1 signals.

In this example, the difference between the two images on a pixel by pixel basis is used directly to drive the wavefront modulators in order to provide the requisite wavefront correction.

Spatial Light Modulators (SLM's) can be used to provide the wavefront modulation. SLM's provide a low-cost, low-voltage and low-volume modulator. In addition, diversity can be applied to the input wavefront in the grating and lens combination. The grating is provided with a carefully selected filter function that satisfies the necessary and sufficient conditions for a null wavefront sensor in accordance with the present invention. The grating allows the source image (in the 0th order) and the phase diverse data (in the ±1 orders) to be displayed on the focal plane, in which a CMOS camera is located.

The images in the diffraction orders are subtracted to deduce the error signal and this information is fed back to the modulators to adjust the correction of the incoming wavefront.

A number of examples of the effect of a null wavefront sensor in accordance with the present invention are now provided. The above analysis has shown that a wavefront sensor can be created using a range of aberration means typically formed from diffractive optical elements. Furthermore, phase diversity filters can be used to give superior performance to the defocus method by using a priori information about the wavefront to be sensed. As seen in FIG. 2, image 19 shows the type of wavefront where the wavefront is scintillated, discontinuous or has disconnected wavefront segments. Aberration means is accordance with the present invention are used in the wavefront sensor to provide an accurate tool for determining wavefront error and therefore correcting the error in the wavefront.

The embodiments of the present invention shown in FIGS. 3, and 5 to 8 of the present invention can be described as Compact adaptive optical systems (CAOS). In general, the apparatus is based on transparent wavefront modulators (e.g.

liquid crystal SLMs) and phase diversity wavefront sensing. As described above, Compact Adaptive Optical (AO) systems, based on the use of DOEs, phase diverse wavefront sensing and transparent wavefront modulators, offer the potential for construction of AO systems with benefits such as:

1. Minimisation of non common-path errors by combining the wavefront sensor data and the corrected image in a single focal plane with essentially no separation of the 'science' and wavefront sensing optical trains;
2. The ability to place wavefront modulators conjugate to multiple planes in the object space whilst preserving a compact and robust optical train that would be particularly well-suited to multi-conjugate; and
3. Avoidance of the requirement for conventional optics, such as beam splitters and conventional bulk optical components for re-imaging conjugate planes, that increases the size and weight of the equipment.

Experimental simulations have been undertaken with plane and non-plane input wavefronts and a range of phase diversity filter functions having properties in accordance with the present invention.

FIGS. 4a to 4d show simulation result with the non-plane wavefront input and the even symmetry phase diversity filter ($Z_{10}^0$, Zernike polynomial). From the simulation result we can see that the intensity difference between +1 order and −1 diffraction images is non-zero for the non-plane wavefront input. This is a sufficient condition for a null wavefront sensor derived from the theory. FIG. 4 correspond to data recorded in an experimental embodiment of the form shown in FIG. 8.

FIGS. 5 to 8 show additional embodiments of the present invention. For reasons of clarity, the detector/camera has been omitted from these figures.

Figure 5:
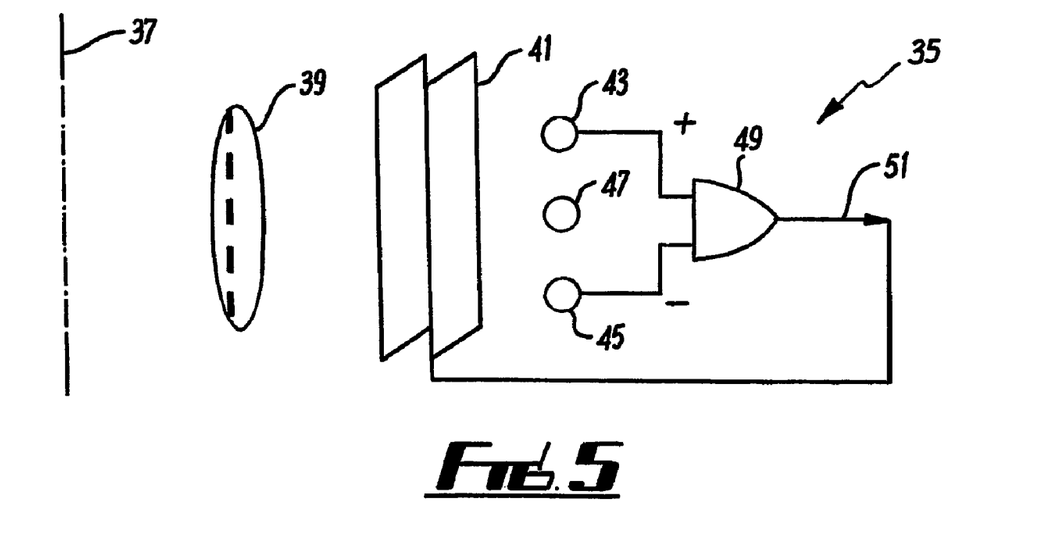
FIG. 5 shows a phase diversity wavefront sensor according to a second embodiment of the present invention.

FIG. 5 shows an embodiment 35 of the present invention in which an input/test wavefront 37 is shown at a position remote from a lens/grating 39. A modulator 41 is also shown connected to the output 51 of the logic circuit 49 which is used to calculate the difference in the intensity signals generated at $I_1$ and $I_2$ denoted by reference numerals 43 and 45 respectively. $I_0$ denoted by reference numeral 47 describes the position of the image of the wavefront 37.

In this example of the present invention, the input/test wavefront is positioned remotely from the lens/grating 39. It has been found that such an arrangement provides a sufficient degree of spatial resolution of the $I_1$ and $I_2$ signals to allow the actual position in the wave front of the non-planar part to be identified. This feature is particularly useful where the present invention is to be used as an adaptive optical device for the correction of input wavefronts. In this example, the measured, spatially separated values of $I_1$ and $I_2$ will contain dark and bright areas where the wavefront has deviated from being a planar wavefront. Once the difference between the calculated values of $I_1$ and $I_2$ has been calculated, the logic circuit 49 will create a signal which allows the modulator to adjust the shape of the wavefront to make it planar.

Figure 6:
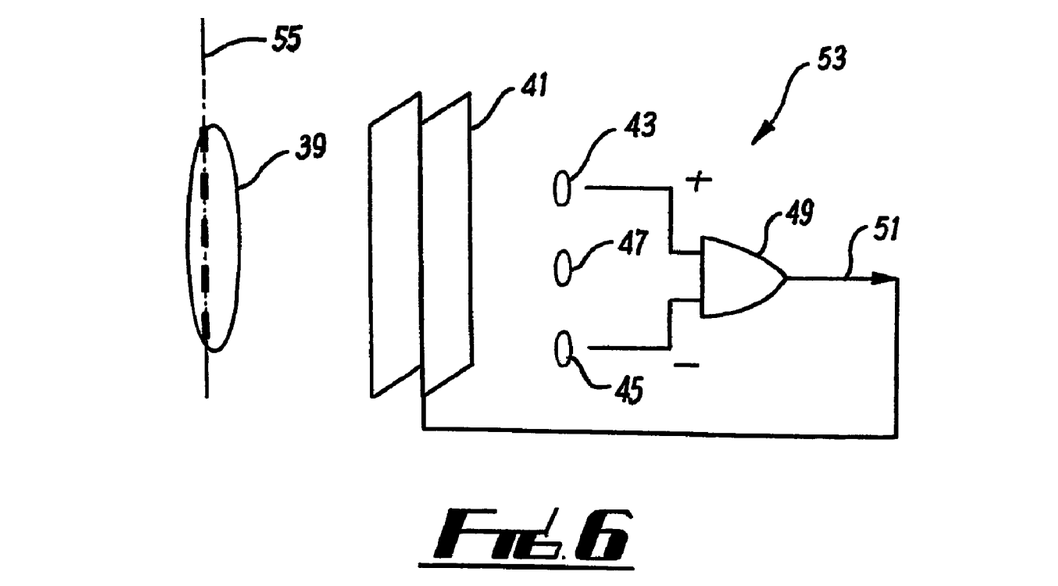
FIG. 6 shows a phase diversity wavefront sensor according to a third embodiment of the present invention.

FIG. 6 shows a further embodiment 53 of the present invention in which the input/test wavefront 55 is arranged in the plane of the lens/grating 39. In this example, the output at $I_1$ and $I_2$ provide less well spatially resolved signal. Therefore, it is more difficult to obtain information on the exact position across the wavefront where the wavefront is non-planar. In this example the logic circuit is used to provide a good indication of the size of the error, but less spatial information. A value for the overall wavefront error may be obtained relatively quickly. FIGS. 4 and 9 show simulations of the data obtained for embodiments of the type shown in FIG. 6.

Figure 7:
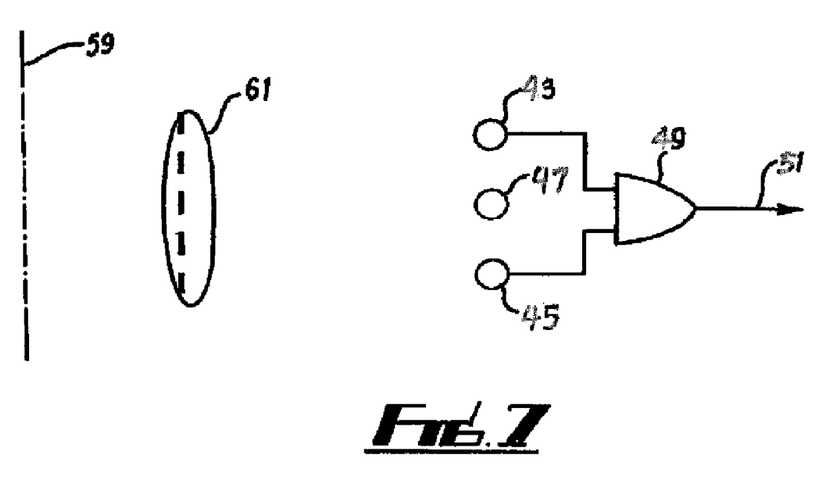
FIG. 7 shows a phase diversity wavefront sensor according to a fourth embodiment of the present invention.
Figure 8:
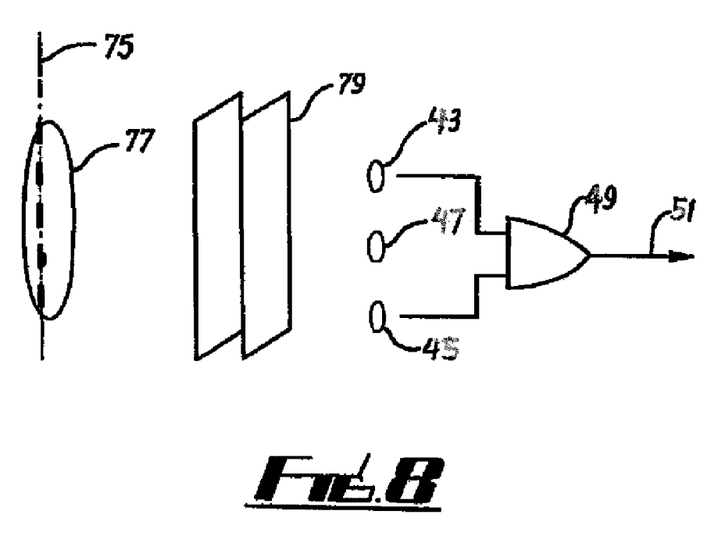
FIG. 8 shows a phase diversity wavefront sensor according to a fifth embodiment of the present invention.

FIGS. 7 and 8 provide additional embodiments of the present invention with FIG. 7 showing a wavefront remote from the lens/grating and FIG. 8 showing a wavefront in the plane of the lens/grating. In addition, a modulator 79 is provided in the apparatus of FIG. 8 to allow resolution of complex wavefront shapes.

The examples of FIGS. 7 and 8 are primarily intended for use with analytical instruments where the wavefront shape 59, 75 is a reflection from a surface such as a mirror. The reflections are used to measure the shape and quality of the surface from which the wavefront has been reflected. As with the arrangement shown in FIG. 5, FIG. 7 provides an output from $I_1$ and $I_2$ that is relatively highly spatially resolved and which provides an output 51 in the form of data on the position of the wavefront error, which in turn provides information on the defect in the surface. As with the arrangement in FIG. 6, the arrangement in FIG. 8 provides a relatively quick measure of the magnitude of an error.

Typically, these instruments can be used for measuring defects in astronomical mirrors.

FIG. 9 shows results with the Zernike polynomial $Z_{10}^0$ phase diversity filter function used to create aberration means in an embodiment of the present invention. This filter function is an even phase diversity.

Figure 9A:
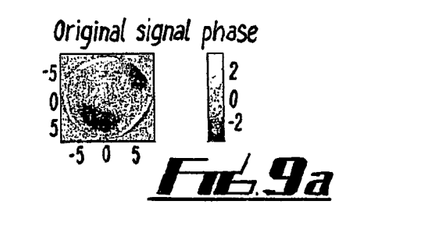
FIG. 9 shows results with the Zernike polynomial $Z_{10}^0$ phase diversity filter used to create aberration means.
Figure 9B:
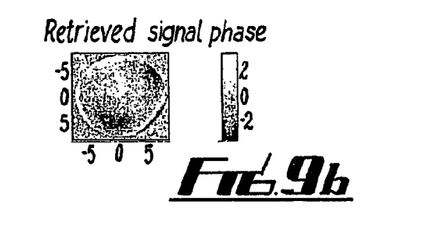
Figure 9C:
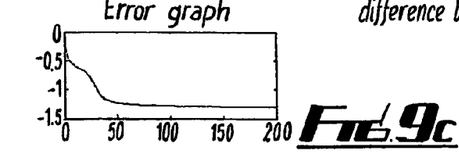
Figure 9D:
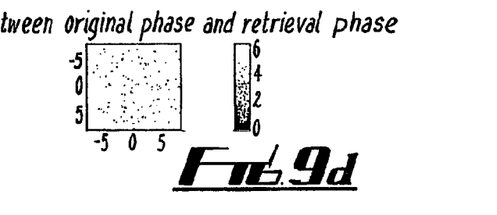
Figure 9E:
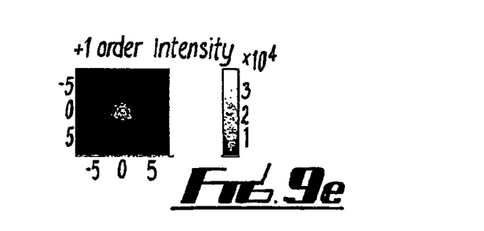
Figure 9F:
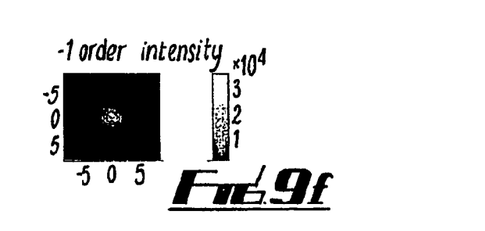

FIGS. 9a and 9b show the original signal phase and the retrieved signal phase. FIG. 9c shows the difference between these phases, FIG. 9d shows the ln error value plotted against the number of iterations and FIGS. 9e and 9f show the I+1 and I−1 images.

Figure 10A:
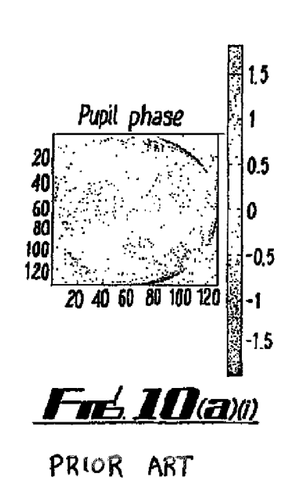
Figure 10B:
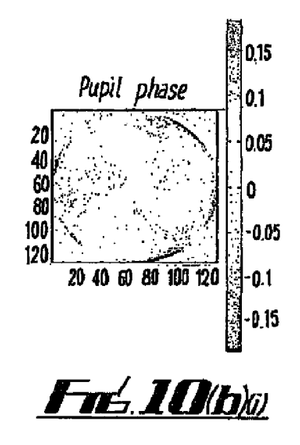

FIGS. 10(a) (i) to (iii) show the wavefront intensity of a wavefront in the pupil phase, the output intensity distribution of a difference image and the associated prior art quadratic diffractive optical element. FIGS. 10(b) (i) to (iii) show the wavefront intensity of a wavefront in the pupil phase, the output intensity distribution of a difference image and the associated pure spherical diffractive optical element, an embodiment of the present invention. The prior art defocus grating is constructed using a curve described by the expression $2\xi^2-1$. The spherical grating is constructed using a curve described by the expression $6\xi^4-6\xi^2+1$.

The mathematical shape of the input wavefront has sufficient continuity and uniformity of intensity to operate with the prior art defocus grating and a grating suitable for use in the present invention. As shown in the diagram of the pupil phase in FIGS. 10(a)(i) and 10(b)(i) are substantially identical. However, it will be noted that the amplitude of the input wavefront error for FIG. 10(b)(i) is approximately 10% of the amplitude error shown in FIG. 10(a)(i). The difference images 10(a)(ii) 10(b)(ii) have substantially the same intensity. Therefore, the wavefront sensor created using filter functions which are complex valued and which have non-mixed symmetry has superior sensitivity compared to the defocus only quadratic filter.

Other non-quadratic polynomials may be used to define curves for constructing gratings in accordance with the present invention.

The error graph is created using a known iteration algorithm and indicates that the error reduces to a substantially constant value after around 50 iterations in this example. It has been found that the error values for the $Z_{10}^0$ polynomial are in this example, lower that those achieved using a defocus filter.

Figure 11A:
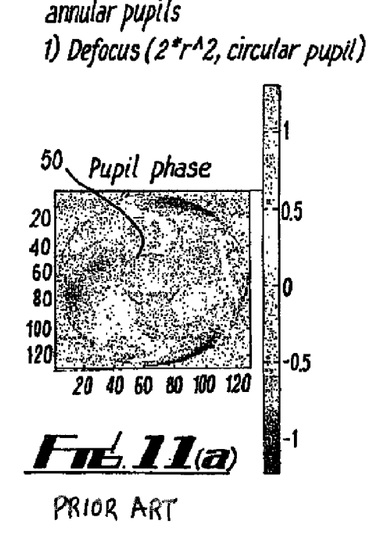
FIGS. 11(a) to 11(d) show a discontinuous pupil phase wavefront and outputs with a prior art defocus grating and a grating according to the present invention.
Figure 11B:
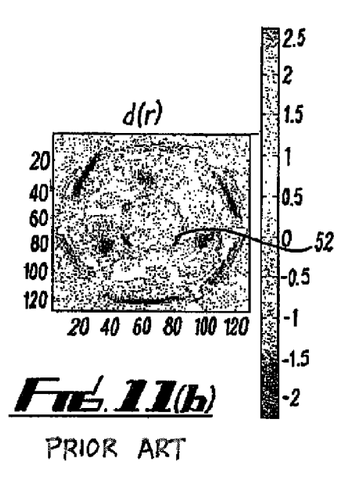
Figure 11C:
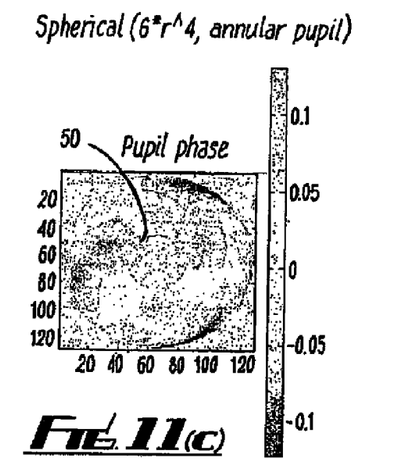
Figure 11D:
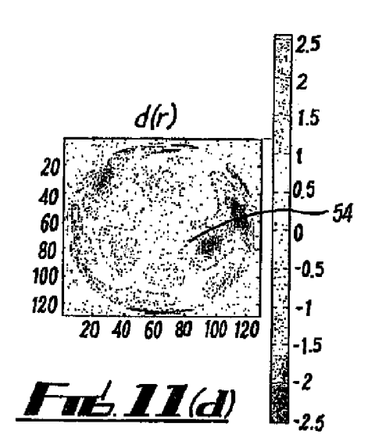

FIGS. 11a and 11b show wavefront intensity in the pupil phase and output intensity after the wavefront has passed through a defocus grating as shown in FIG. 10(a)(iii). FIGS. 11c and 11d show wavefront intensity in the pupil phase and output intensity after the wavefront has passed through a spherical aberration diffraction grating as shown in FIG. 10(b)(iii). In both FIGS. 11(a) and 11(c), the input wavefronts are identical and have a central obscuration 50 in the centre of the wavefront. The central obscuration shown is of the type found in telescopes.

It can be seen from FIG. 11(b) that there are a number of features around the boundary of the central obscuration 52 when the wavefront passes through a defocus grating. These features arise because of the sensitivity of the defocus grating to the missing boundary and do not represent errors in the wavefront, but are created by the optical properties of the defocus grating. In a wavefront sensor, the presence of such features would prevent accurate modification of the wavefront shape and prevent the creation of a plane wavefront.

It can be seen from FIG. 11(d) that the boundary around the central obscuration 54 is smooth. Therefore, the use of a grating in accordance with the present invention is which the grating is constructed such that the shape of the aberrating means is defined by a filter function that is complex valued and has non-mixed symmetry.

In further examples of the present invention, the input wave can be moved and the a grating whose shape is defined by a polynomial in accordance with the present invention, selected to provide optimum results. This can be achieved through statistical analysis of the wavefront.

Improvements and modifications may be incorporated herein without deviating from the scope of the invention.

REFERENCES

[i] Chapman, S. E., S. L. Morris, and G. A. H. Walker, *Near-infrared adaptive optics imaging of nuclear spiral structure in the Seyfert galaxy NGC* 3227. Monthly Notices of the Royal Astronomical Society. 2000. 319(3): p. 666-76

[ii] Murphy, D. V., *Atmospheric-turbulence compensation experiments using cooperative beacons.* Lincoln Laboratory Journal. 1992. 5(1): p. 25-44

[iii] Salmon J T et al, *Adaptive optics system for solid-state laser system used in inertial confinement fusion,* in: Intl Conf on Solid State Lasers for Appln to Inertial Confinement Fusion, 1995, Monterey, Calif., USA

[iv] Cherezova, T. Y., et al., *Super-Gaussian laser intensity output formation by means of adaptive optics.* Optics Communications 155(1998)99-106.

[v] Roorda and/or WilliamsRoorda A and Williams D R, The arrangement of the cone classes in the living human eye, Nature 397(1999)520-522.

[vi] Toubin F, Xuerning Z and Jiaxiong Y, *Research on the dynamics of a multi-dither adaptive optical system,* Opt Eng 37(1988)1208-1211.

[vii] Gonsalves R A, *Phase retrieval and diversity in adaptive optics,* Opt Eng 10(1982)829-832.

[viii] Misell D L, *An examination of an iterative method for the solution o the phase problem in optics and electron optics: I Test calculations,* J Phys D: Applied Physics 6(1973) 2200-2216.

[ix] Gureyev, T. E. and K. A. Nugent (1996). "Phase retrieval with the transport-of-intensity equation. II. Orthogonal series solution for nonuniform illumination." Journal of the Optical Society of America A: Optics and Image Science, and Vision 13(8): 1670.

[x] Blanchard P M, Fisher D J, Woods S and Greenaway A H, *Phase-diversity wave-front sensing with a distorted diffraction grating,* Appl Opt 39(2000)6649-6655.

[xi] Roddier F, *Curvature sensing and compensation: a new concept in adaptive optics,* Appl Opt 27(1988)1223-1225.

[xii] Neil M A A, Booth M J and Wilson T, New modal wavefront sensor: a theoretical analysis, J Opt Soc Am A 17(2000)1098-1107

[xiii] Roddier C and Roddier F, *Wave-front reconstruction using iterative Fourier transforms,* J Opt Soc Am A 10(1993) 2277-2287

[xiv] Baba N, Tomita H and Noriaki M, *Iterative reconstruction method in phase diversity imaging,* Appl Opt 33(1994) 4428-4433

[xv] Teague M R, *Deterministic phase retrieval: a Green's function solution,* J Opt Soc Am A 73(1983)1434-1441.

[xvi] Woods S C and Greenaway A H, Wave-front sensing by use of a Green's function solution to the intensity transport equation, J Opt Soc Am A 20(2003)508-512

[xvii] Djidel S and Greenaway A H, *Nanometric wavefront sensing,* in: 3rd Intl Workshop on Adapt Opt In Industry and Medicine 2002, Starline Printing Inc.

[xviii] Vorontsov, M. A., G. W. Carhart, and J. C. Ricklin, *Adaptive phase-distortion correction based on gradient-descent optimization.* Optics Letters. 1997. 22(12): p. 907-9

The invention claimed is:

1. A measuring apparatus for determining data relating to the shape of an input radiation wavefront, the wavefront shape being describable at a pre-determined location in an optical system, the apparatus comprising:
aberration means, the shape of which is defined by a filter function that is complex valued and has non-mixed symmetry; and
detection means having a radiation sensitive surface capable of detecting an intensity of incident radiation on the surface, the detection means being coupled to an output device that provides a measure of the intensity of the incident radiation;
wherein the aberration means is configured to act on the input radiation wavefront to produce first and second output radiation signals that are distorted images of the input radiation wavefront,
wherein the detection means detects the first and second radiation signals and in response thereto causes the output device to provide an output signal relating to the shape of the input radiation wavefront.

2. A measuring apparatus as claimed in claim 1 wherein the aberration means creates at least two filter functions, the filter functions being a complex conjugate pair.

3. A measuring apparatus as claimed in claim 1 further including a wavefront modulator coupled to the output device such that the wavefront modulator is distorted to provide a correction to a non-planar input radiation wavefront.

4. A measuring apparatus as claimed in claim 3 wherein the wavefront modulator is configured to transform a wavefront being describable by means of a complex function into a wavefront being describable by a real function.

5. A measuring apparatus as claimed in claim 1 wherein the output device is provided with calculation means for calculating a difference between the first and second radiation signals.

6. A measuring apparatus as claimed in claim 1 wherein the radiation sensitive surface of the detection means is provided with elements that allow the measurement of radiation intensity at different points across the surface of the detection means.

7. A measuring apparatus as claimed in claim 5 wherein the calculation means calculates the difference between the first and second radiation signals at different points across the surface of the detection means.

8. A measuring apparatus as claimed in claim 1 wherein the filter function is a weighted sum of Zernike polynomials arranged to equalise a signal generated from each mode of deformation in the input wavefront according to an expected statistical distribution of such modes in the input radiation wavefront.

9. A measuring apparatus as claimed in claim 2, wherein the aberration means is arranged such that the complex conjugate filter functions of the aberration means are associated with diffraction orders of the same order but having different signs.

10. A measuring apparatus as claimed in claim 1, wherein the first and second output radiation signals are produced simultaneously.

11. A measuring apparatus as claimed in claim 1, wherein the first and second output radiation signals are produced sequentially.

12. A measuring apparatus as claimed in claim 1, wherein the aberration means is a diffractive optical element.

13. A measuring apparatus as claimed in claim 1, wherein the aberration means is a variable-shape optical mirror.

14. A measuring apparatus as claimed in claim 1, wherein the aberration means is a variable refractive index device.

15. A measuring apparatus as claimed in claim 14 wherein the variable refractive index device is a liquid crystal phase modulator used sequentially to provide complex conjugate aberrations.

16. A method for determining data relating to the shape of an input radiation wavefront, the wavefront shape being describable at a pre-determined location in an optical system, the method comprising:
transmitting said input radiation wavefront through an aberration means, the shape of which is defined by a filter function that is complex valued and has non-mixed symmetry, wherein the aberration means acts on the input radiation wavefront to produce first and second output radiation signals that are distorted images of the input radiation wavefront;
detecting an intensity of the first and second radiation signals; and
sending the detected intensity to an output device that in response thereto provides the data relating to the shape of the input radiation wavefront.

17. A measuring apparatus for determining data relating to the shape of an input radiation wavefront, the wavefront shape being describable at a pre-determined location in an optical system, the apparatus comprising:
aberration means, the shape of which is defined by a filter function that is complex valued and has non-mixed symmetry, wherein the aberration means is configured to act on the input radiation wavefront to produce first and second output radiation signals that are distorted images of the input radiation wavefront; and
detection means having a radiation sensitive surface adapted to detect the first and second radiation signals; and
an output device coupled to an output of the detection means and in response thereto outputs an output signal indicating the shape of the input radiation wavefront.

18. The measuring apparatus of claim 17, further comprising a wavefront modulator coupled to the output signal of the output device to modulate the input radiation wavefront in response thereto.

19. A measuring apparatus as claimed in claim 17, wherein the output signal from the output device indicates an extent to which the wavefront shape is non-planar, and wherein when the wavefront shape is planar, the output signal is substantially zero.

20. A measuring apparatus as claimed in claim 1, wherein the first and second output radiation signals, in combination, provide data from the output device indicating an extent to which the wavefront shape is non-planar.

21. A measuring apparatus as claimed in claim 1 wherein the filter function is non-quadratic.

22. A measuring apparatus for determining data relating to the shape of an input radiation wavefront, the wavefront shape being describable at a pre-determined location in an optical system, the apparatus comprising:
aberration means, the shape of which is defined by a filter function, the filter function having a real part and an imaginary part, the real and imaginary parts both having even symmetry or both having odd symmetry, wherein the aberration means is configured to act on the input radiation wavefront to produce first and second output radiation signals that are distorted images of the input radiation wavefront; and
detection means having a radiation sensitive surface adapted to detect the first and second radiation signals, the detection means being coupled to an output device that provides an output signal relating to the shape of the input radiation wavefront.

23. A measuring apparatus as claimed in claim 22 wherein the filter function is complex valued and has non-mixed symmetry.

24. The measuring apparatus as of claim 1, wherein the output signal indicates an extent to which the wavefront shape is non-planar, and wherein when the wavefront shape is planar, the output signal is substantially zero.

25. The method of claim 16 wherein the filter function is non-quadratic.

26. The measuring apparatus as of claim 22, wherein the filter function is non-quadratic.

27. The measuring apparatus as of claim 22, wherein the output signal indicates an extent to which the wavefront shape is non-planar, and wherein when the wavefront shape is planar, the output signal is substantially zero.

* * * * *